United States Patent [19] [11] 3,728,903
Haller [45] Apr. 24, 1973

[54] DEVICE FOR SUPPORTING AN ELONGATED MOVABLE MEMBER
[76] Inventor: Richard Haller, Ueberlandstr. 240, Dubendorf, Switzerland
[22] Filed: Jan. 18, 1971
[21] Appl. No.: 107,030

[30] Foreign Application Priority Data
   Jan. 16, 1970   Switzerland..........................610/70

[52] U.S. Cl..............................74/89.15, 74/424.8 R
[51] Int. Cl...............................................F16h 27/02
[58] Field of Search.........................74/89.15, 424.8, 74/425; 192/97; 308/3.8

[56] References Cited
UNITED STATES PATENTS
3,277,736   10/1966   Goodman............................74/424.8
3,504,555   4/1970   Fry.....................................74/89.15

Primary Examiner—Charles J. Myhre
Assistant Examiner—Wesley S. Ratliff, Jr.
Attorney—Kenneth S. Goldfarb

[57] ABSTRACT

An elongated movable member which may form part of a linear actuator is supported intermediately by means of support devices which are adapted to move to a limited extent with the elongated member and thereafter to be held fixed by stationary abutment means. Each support device includes at least one wheel in bearing engagement with the movable member and if the latter consists of a screw-threaded spindle or a rack the wheel is a toothed wheel engaging the thread or the rack teeth. Friction engagement means cooperating with the wheel ensure that the device moves with the elongated member until the device engages the abutment after which the elongated member moves relatively to the device which then acts as an intermediate support for the elongated member. A cooperating member actuated by the elongated member, for example a nut cooperating with a screw-threaded spindle, may be arranged with recesses to clear the abutment means which engage the support device.

7 Claims, 6 Drawing Figures

PATENTED APR 24 1973 3,728,903
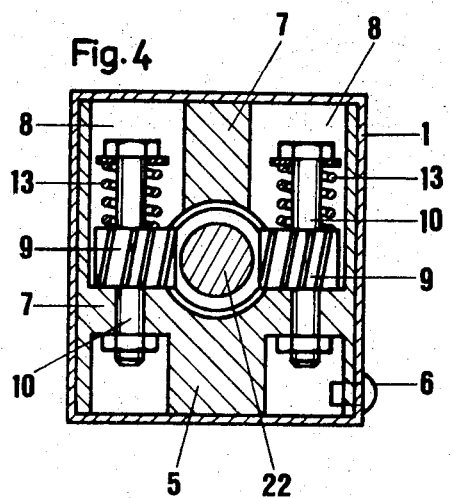
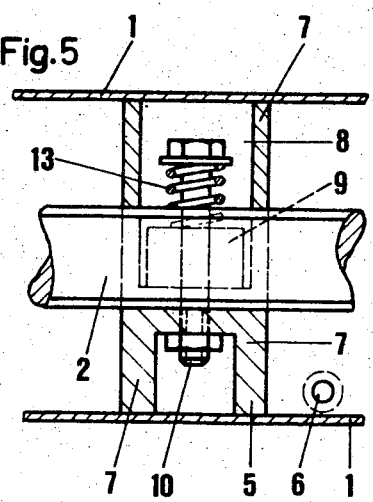
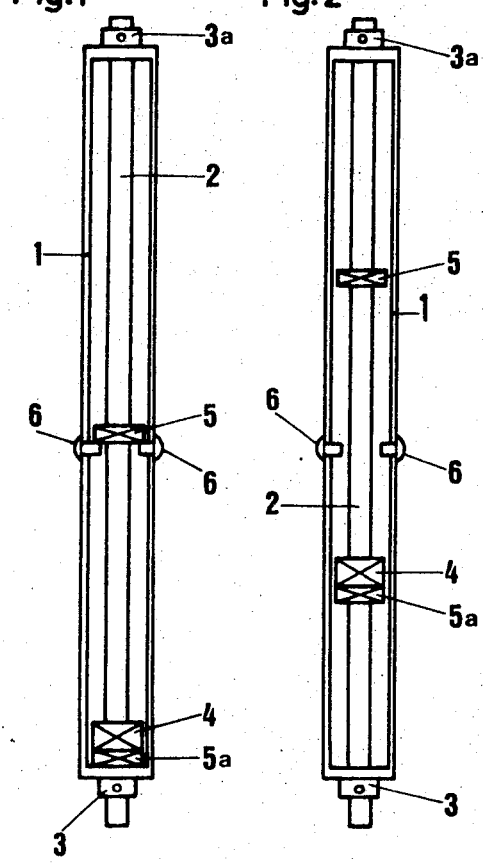
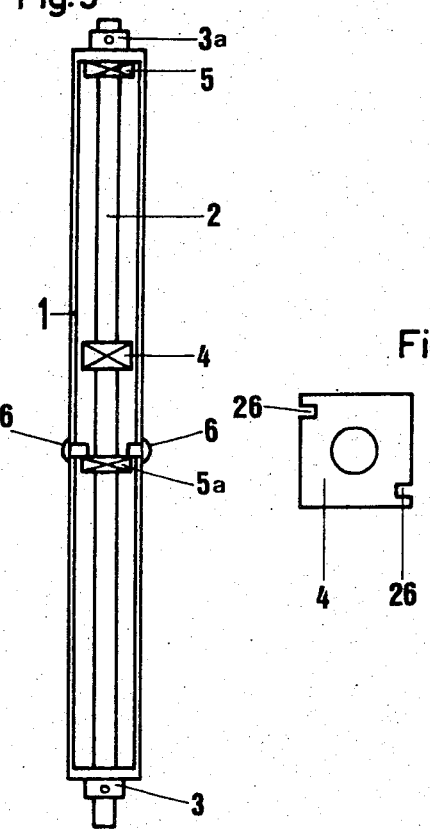
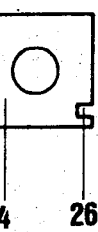
INVENTOR.
RICHARD HALLER
BY
Kenneth S. Goldfarb
ATTORNEY

DEVICE FOR SUPPORTING AN ELONGATED MOVABLE MEMBER

The present invention relates to a device for supporting an elongated movable member especially an axially movable shaft, a screw-threaded spindle or a rack, in which the member is supported by an intermediate bearing in a shaft support member such as a tubular casing. The present invention also relates to a linear actuator system including such a support device.

Intermediate bearings are desirable and often essential for long shafts, screw-threaded spindles or racks to avoid flexure or vibration but such bearings must not interfere with the desired movement of the member or for example of a nut actuated by a screwed spindle. The device of the present invention may be substituted for a normal type of intermediate bearing. In the case of a screw-threaded spindle and a nut actuated by the spindle, the support devices also operate like nuts and move in one direction with the main nut until each support device in turn is stopped by an abutment. Thereby a continuously maintained bearing support is obtained although the main nut may travel over the whole length of the spindle. In the case of a smooth shaft displacement of the shaft may be obtained by any suitable means and the support devices move with the shaft until stopped by abutments.

In order to avoid the disadvantages of known types of intermediate bearings the invention provides a device for supporting an elongated movable member, comprising at least one wheel rotatably supported in said device in bearing engagement with said member to partake in the support of said member during movement and means to restrict free rotation of said wheel to cause the device to move with said member until engaged by abutment means.

The present invention also relates to a linear actuator system in which an elongated member is arranged to effect linear displacement of a cooperating member and is in part enclosed by a casing and in which a support device is provided having at least one wheel which during displacement of the elongated member is adapted to travel to a limited extent, that the wheel is rotatably mounted in the device, that free rotation of the wheel is prevented by a friction brake and that movement-limiting abutment means are disposed in the path of the device to stop the device in a position which provides adequate support for the elongated member while permitting continuing movement of the elongated member.

Two embodiments of the invention are described below by way of example with reference to the accompanying drawings in which:

FIGS. 1 to 3 are longitudinal sections through apparatus incorporating the invention illustrating a displaceable nut and mutually interchanging intermediate support devices in three positions, FIG. 4 is a cross-section through the support devices on an enlarged scale, FIG. 5 is an axial section through the device on the same scale, and FIG. 6 illustrates an end view of the displaceable nut.

In accordance with a first embodiment which relates to a linear actuator a screw-threaded spindle 2 is rotatably mounted in two bosses 3 at the ends of a casing, and the spindle actuates a nut 4 as a cooperating linearly actuated member.

The nut 4 can travel to and fro over the whole length of the spindle 2 dependently upon the direction of rotation of the spindle. Because of the great length of the spindle 2 and the magnitude of the driving force exerted by the nut 4 the spindle 2 must be additionally supported at least at one point between the two bosses 3 and such support is effected by means of intermediate bearing elements or support devices such as the device 5, shown in FIG. 1. However, since the nut must travel past the center point at which this intermediate support device is located in FIG. 1, the device 5 is arranged to be displaced towards the boss 3a in the manner described below, at the same feed speed as the nut 4. Simultaneously a further intermediate bearing element 5a travels behind the nut 4 from the boss 3 towards the center of the casing 1. In this manner the position according to FIG. 2 is at first obtained. When the nut 4 travels further and beyond the center of the casing 1 abutment means 6 disposed in the casing 1 prevent the second support device 5a from moving beyond this point where it then performs the function of the first mentioned device in FIG. 1. In spite of further rotation of the spindle 2 the device 5a remains in the position illustrated in FIG. 3, whereas the nut 4 is not affected by the abutment means 6 (see FIG. 6) and moves on. In the intervening period the first-mentioned device 5 travels to the end of the spindle 2 where it comes to rest against the boss 3a.

As may be seen from FIGS. 1 to 3, the spindle remains satisfactorily supported at all times, i.e. the spacing between the points at which the spindle is supported does not increase during the movement, and the fact that the spacing may decrease at some points of its travel does not constitute a disadvantage.

If the length of the spindle 2 requires more than one intermediate support device 5 the casing may be provided with further abutment means such as pins or stops 6 disposed at desired mutual spacing in which case as many intermediate devices 5 are disposed on both sides of the nut 4 as there are abutment means in the casing. Each intermediate device is then so constructed that it is engaged by a respective abutment means, thus ensuring adequate support of the spindle.

As shown in FIGS. 4 and 5, the device 5 consists of a plate 7 with recesses 8 each of which is adapted to accommodate a gear wheel 9 which engages the screw-thread of the spindle 2 so that it forms a worm drive therewith. Each gear wheel is rotatably mounted on a bearing shaft 10 which is attached to the plate 7, in the present example by means of a nut 10a engaging a screw-threaded end portion of the bearing shaft 10. A compression spring 13 is disposed around the shaft and presses the gear wheel 9 against the plate 7. By adjusting the compression of the compression spring 13 — which can be effected by rotating the bearing shaft 10 relatively to the nut 10a — the axial pressure on the gear wheel 9 can be varied whereby the friction between the gear wheel 9 and the plate 7 is changed. This arrangement serves as a friction brake which restricts free rotation of the gear wheel 9. This pressure or friction force must be so adjusted that it overcomes the friction effect between the plate 7 and the casing 1 whereby the device 5 acts as a nut but can be stopped by engagement with the abutment means 6. During the rotation of the spindle 2 the device 5 moves axially of the spindle 2 because the gear wheels 9 are held stationary and function like nuts on the spindle 2. This displacement continues until a detaining force is exerted upon the support device 5 which exceeds the braking effect between the gear wheel 9 and the plate 7. This occurs when the support device engages the pin or stop abutment means 6 or one of the bosses 3 or 3a. Upon engagement with the abutment means the gear wheels 9 are rotated in the manner of a worm drive and the support device 5 is stationary as the gear wheels 9 rotate. In order that the nut 4 is not stopped by the abutment pins 6 the nut 4 is provided with recesses 26 which clear the abutment pins.

In the example just described the displaceable nut 4 is substantially a ring with an internal screw-thread which engages the screw thread of the spindle 2. However, from the construction of the device 5 and its manner of working, in particular its displacement which has been described in detail, it will be clear that the nut 4 may be constructed in the same manner as the support device 5. The braking pressure exerted upon the gear wheels must then be increased as the nut 4 is designed as a linear actuator.

If the spindle axis and the gear wheel axis are disposed in directions at right angles to each other, the gear wheel is preferably provided with inclined or helical teeth. If the gear wheel 9 is provided with straight teeth the gear wheel axis should preferably make the correct angle with the spindle.

Since the intermediate support devices 5 are preferably slidable in the casing 1 they consist preferably of a synthetic resin which serves in particular as a bearing or sliding material.

What I claim is:

1. A device for supporting an elongated movable member comprising a casing, said movable member being rotatably mounted in said casing, abutment means on said casing extending towards said movable member, said device including a plate frictionally non-rotatably slidably engaging said casing, at least one wheel in bearing engagement with said member to partake in the support of said member during movement, said wheel being rotatably mounted on said plate, and resilient means engaging said wheel urging said wheel against said plate to restrict free rotation of said wheel to cause said device to move with said member until engaged by said abutment means.

2. A device according to claim 1, wherein said elongated member is a rotatable screw-threaded spindle and said wheel is a gear wheel meshing with the screw thread.

3. A device according to claim 1, wherein said elongated member is a rack and said wheel is a gear wheel.

4. A device according to claim 1, wherein said elongated member is a smooth shaft and said wheel is a friction wheel.

5. A device according to claim 2, wherein a nut is axially displaceable on said screw-threaded spindle by rotation of the latter for performing a linear actuation function by importing rotation to said spindle.

6. A linear actuator according to claim 1, wherein the device is provided with two wheels which are disposed diametrically relatively to the elongated member.

7. A device according to claim 5, including a shaft journalled in said plate, said gear wheel being mounted on said shaft, said resilient means being a coil spring disposed on said shaft.

* * * * *